Dec. 9, 1947.    F. G. LOGAN    2,432,244
ELECTRIC CONTROLLING APPARATUS
Filed May 24, 1944    2 Sheets-Sheet 1

INVENTOR.
FRANK G. LOGAN
BY
Lawrence K. Sager
his ATTORNEY

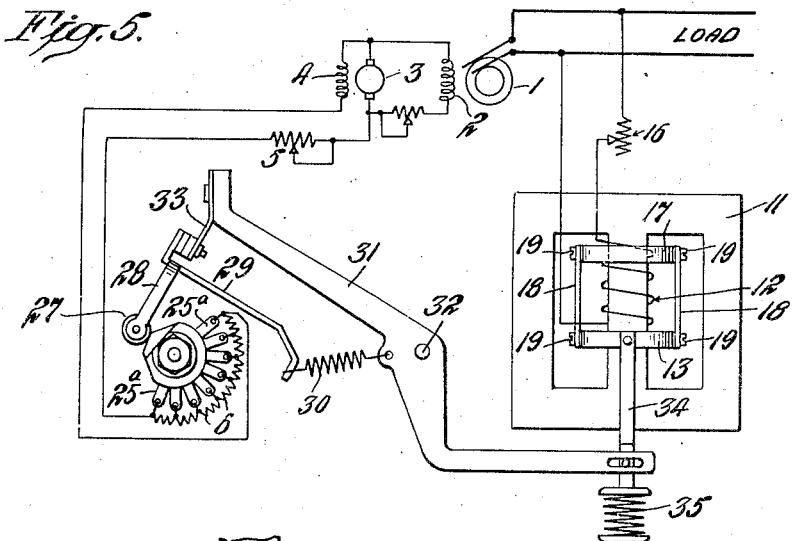
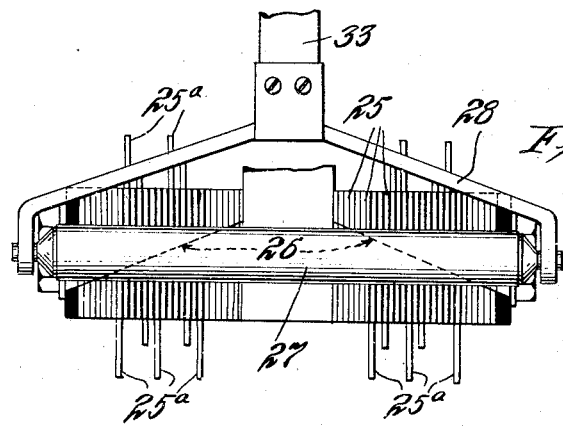
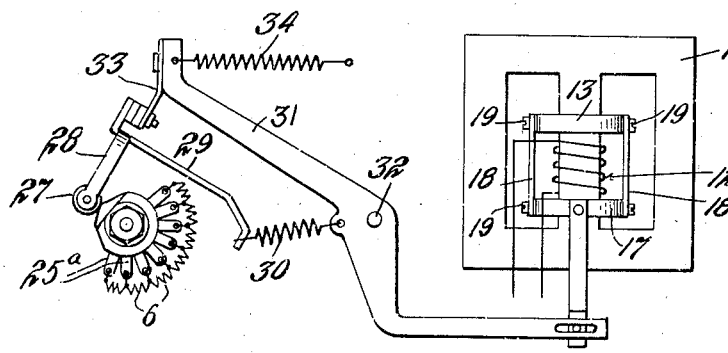

Patented Dec. 9, 1947

2,432,244

UNITED STATES PATENT OFFICE 2,432,244

ELECTRIC CONTROLLING APPARATUS

Frank G. Logan, Mount Vernon, N. Y., assignor to Ward Leonard Electric Company, a corporation of New York Application May 24, 1944, Serial No. 537,037

5 Claims. (Cl. 201—48)

1

This invention relates to electric controlling apparatus and particularly to electric regulators for controlling the voltage or other variable factor of an alternating current generator and is likewise applicable to other purposes where a variable current is utilized for securing sequential control of portions of a circuit or of one or more circuits depending upon the strength of the controlling current.

The invention is based upon the fact that currents passing in opposite directions through two adjacent conductors will create a repelling force between the conductors; and also on the fact that a current induced in a conductor by a variable current in an adjacent conductor is in a direction opposite to the inducing current and thereby creates a repelling force between the two conductors. Also the magnitude of the force will depend upon the value of the induced current in its relation to the inducing current.

One object of the invention is to provide an improved controller of a simple form wherein the controlling current is an alternating current and is directly applied to actuate the controlled means. Where the source of the controlling current is alternating, it is common practice to rectify this current for obtaining a direct current for use in the controlling magnet in order to avoid undesirable vibratory motion which would occur if the alternating current were used to excite the controlling magnet. By the present invention the alternating current may be used directly in the controlling device without producing undesirable vibration. Another object is to provide a form of controlling means which may be readily adjusted for sensitivity of response and for producing any desired character of regulation or control. Another object is to provide controlling apparatus of a simple form and wherein the parts required and their cost are reduced to a minimum. Another object is to provide controlling means which will be dependable under long continued use and require a minimum amount of attention for maintenance. Other objects and advantages will be understood from the following description and accompanying drawings illustrating various embodiments of the invention.

Figure 1:
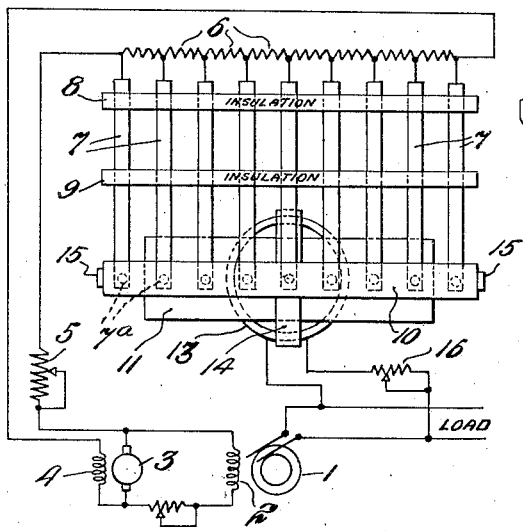
Figure 2:
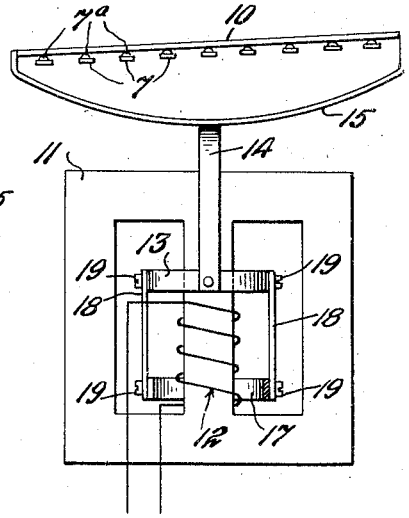
Figure 3:
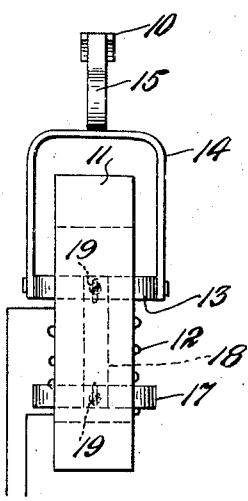
Figure 4:
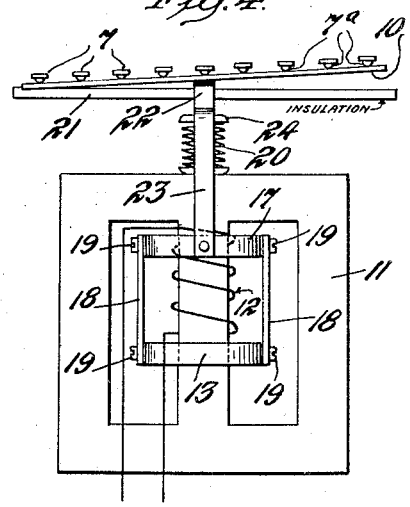

Fig. 1 is a diagram showing one form of regulator and controlling means; Fig. 2 is a front view of a portion of the controlling means of Fig. 1; Fig. 3 is a side view of Fig. 2; Fig. 4 is a front view of a modified form of controlling means; Fig. 5 is a diagram of another form of regulating means showing the invention applied to a different type of control; Fig. 6 is a side view of the resistive controller of Fig. 5; and Fig. 7 is a front view of controlling means similar to that of Fig. 5 but operative in the reverse direction of movement.

Fig. 1 shows an alternating current generator 1 having a separately excited field winding 2

2 which is energized by a direct current exciter having an armature 3 and a self-excited field winding 4. A manually adjustable rheostat 5 is shown in series with a number of resistive sections or elements 6 connected in series with each other. Only a few of such resistive sections are indicated for simplicity, but in practice a much greater number would ordinarily be used for obtaining refined control between steps of resistance. The type of variable resistive device of Fig. 1 is similar to that disclosed in my prior Patent No. 2,338,250 granted January 4, 1944. In Fig. 1 hereof the taps extending from between the sections of resistive elements 6 are connected to the ends of the conducting metal strips 7 which are held in fixed position at their rear ends by a cross bar 8 of insulating material. These strips are in the form of leaf springs and are biased in a direction to move upwardly at their front ends against an insulating cross bar 9 which extends over them at intermediate portions of the spring strips. The front ends of the spring strips are provided with contacts 7a at their top surfaces, as more particularly shown in Fig. 2. A movable inclined cross bar 10 of metal extends over the top of the contacts 7a and when this bar is in its lowest position as shown in Fig. 2, it engages all of the contacts 7a against the upward bias of the strips 7 and restrains them from engagement with the cross bar 9. In this position of the bar 10 all of the resistive elements 6 are short-circuited by the bar. It thereby removes this resistance from the field circuit of the exciter and imposes a strong field on the exciter. When the bar 10 is raised slightly from the position shown in Fig. 2, the right-hand contact strip 7 will engage the lower surface of the cross bar 9 and thus cause the insertion in the field circuit of the right-hand resistive element or section 6. This weakens the field strength of the exciter slightly. Further upward movement of the bar 10 will permit the second strip 7 from the right to engage the under-surface of the bar 9 and thereby insert another resistive section 6 in the field circuit and further weaken the field strength. Further upward movement of the bar 10 will cause the remaining strips 7 to engage the bar 9 successively and thereby successively insert additional sections of the resistance 6 in the field circuit. In the uppermost position of the bar 10 all of the strips 7 engage the under-surface of the cross bar 9 because none of the contacts 7a are then engaged by the bar which results in all of the resistance 6 being inserted in the exciter field circuit and thereby imposes a weak field on the exciter. As the bar 10 moves downwardly from the uppermost position, the contacts 7a are successively engaged by the bar resulting in the full field strength being imposed on the exciter in the lowest position of the bar.

The movement of the bar 10 is controlled by an alternating current device utilizing the princ'ples of operation already referred to. Fig. 2 shows one form of core 11 which is of the three-legged laminated type, although various other forms of core may be used. The middle leg of the core is provided at its lower portion with a primary winding 12. Above this winding is positioned a closed circuited conducting element 13 in the form of a ring which encircles the middle leg of the core. This ring is movable in a straight line direction along the upper portion of the middle leg. An upwardly extending bail 14 is connected on opposite sides of the ring and at its upper mid-portion is connected another upwardly extending bail 15, the plane of which is at right-angles to the plane of the bail 14. The upper ends of the bail 15 are connected to opposite ends of the bar 10.

Primary winding 12 is connected across the load circuit of the generator 1 through an adjustable rheostat 16 as shown in Fig. 1. In the automatic regulating action, the rheostat 5 would ordinarily be moved to the resistance-all-out position and the rheostat 16 would be adjusted to a position to cause the cross bar 10 to be at about the mid-position of its movement under the desired normal voltage of the generator. When the apparatus is not in operation, the weight of the parts including that of the bar 10, its supports and the ring 13 would be sufficient to cause the bar 10 to assume its lowest position as shown in Fig. 2. In some cases a spring may be utilized for increasing the biasing force to cause the parts to assume their lowest position. Under operating conditions, the alternating current supplied to the primary winding 12 will induce alternating current in the closed conducting element 13 and thereby create a repelling force between the element 13 and the winding 12. This causes the conducting element 13 to move upwardly and thereby insert certain of the resistive elements 6 in the exciter field circuit and automatically adjust the field strength of the alternator for delivering the normal voltage to the load circuit as determined by adjustment of the rheostat 16. This normal voltage will be automatically maintained under changes in load or change in speed of the generator in the following manner. Upon any increase in the line voltage, an increased current will pass through the primary winding 12 and thereby induce increased currents in the ring 13 which in turn increases the repellent force between the ring and the primary winding and causes the bar 10 to be raised slightly or sufficiently to include additional resistive sections 6 in the exciter field circuit. This weakens the generator field sufficiently to restore the line voltage to its approximate normal value. Similarly upon any decrease of the line voltage below normal, the controlling current in the primary winding 12 is decreased which decreases the repellent force exerted upon the conducting element 13 and thereby permits the biased force of the parts to cause the bar 10 to move to a slightly lower position and short-circuit one or more of the resistive elements 6 which in turn strengthens the field of the exciter and raises the voltage of the generator to approximately its normal amount.

The character of response may be controlled by the relative proportions of the parts, the amount of leakage flux in the core of the transformer, the conductance of the ring 13 as determined by its cross section and the conductivity of the selected metal, the weight of the parts, the stiffness of the spring strips 7 and various other features of design. In some cases the conducting element 13 may be in the form of several individual rings closed on themselves, or in series with each other, or in the form of a low resistance winding closed on itself. Where the controlling means is subjected to considerable change in temperature, the temperature coefficient of resistance of the ring 13 would affect the voltage of the generator and cause a drift in voltage unless the temperature coefficient of the conducting element 13 be zero or of a negligible amount. In order to overcome the effect of temperature changes, the conductor 13 should have a low temperature coefficient of resistance, such as a copper nickel alloy.

A further feature of improvement resides in the provision of an additional conducting element shown as a ring 17 closed on itself and positioned below the magnetic center of the winding 12, as shown in Figs. 1, 2 and 3. This conducting ring surrounds the middle leg of the core and the winding 12 and is subjected to induced currents therein upon the passage of an alternating current in the control winding 12. A repellent force is thereby created between the winding 12 and the conducting element 17; and owing to its being positioned below the center of the winding 12 as shown in Fig. 2, the repellent force will tend to move the conductor 17 downwardly and tend to retain it in its lowest position. The ring 17 is shown connected by upwardly extending side strips 18 with the upper ring 13 causing the rings to be movable as a unit. The connection between the two rings 13 and 17 may be made adjustable in any convenient manner as by means of providing slots in the strips 18 through which the clamping screws 19 pass. The character of the conducting element 17 may be of different form as already described with reference to the conductor 13 and made of metal of low coefficient of resistance for overcoming the effect of temperature changes.

The ring 17 serves to modify the resultant force exerted upon the conducting bar 10. In the lowest position shown in Fig. 2, the ring 17 being below the center of the winding 12 will cause a downward force to be exerted upon the movable unit of the controller. It thereby cooperates with the force of gravity exerted upon the parts and with any biasing spring when such spring is used and tends to offset to a greater or lesser extent the increased pressure of the spring strips 7 when the movable unit is in its lowest position. When current passes through the primary winding 12 and gradually increases, the upward repellent force exerted upon the ring 13 predominates over the downward repellent force exerted upon the ring 17, giving a resultant upward movement of the parts and inserting certain of the resistive sections 6 in the field circuit of the exciter as already described. As the unit moves upwardly, the ring 17 approaches nearer the magnetic center of the winding 12 which results in a gradually decreasing downward force being exerted by the ring 17. It thereby compensates to a more or less extent the decreasing upward force exerted by the spring strips 7 as the conducting bar 10 moves upwardly. By properly proportioning the ring 17 and by adjustment of its fixed distance from the ring 13, the magnitude of the downward force exerted by the ring 17 may be adjusted to any desired amount in relation to the upward force exerted by the ring 13 and to the variable upward force exerted by the spring strips 7. In this manner the sensitivity and character of response of the movable unit of the controller may be adjusted to secure the desired responsive action in the different positions of the movable unit. When the parts have moved to a position to cause the ring 17 to surround the magnetic center of the winding 12, no repellent force is created between the winding 12 and the ring 17; and if the ring 17 moves above this center, the repellent force exerted upon it will then be additive to that imposed upon the ring 13. Thus the adjustment of the distance between the rings 13 and 17 may be such as to not only cause a decreasing downward force to be exerted by the ring 17 as the parts move upwardly but may be caused to pass the neutral zone and then exert an upward force cooperating with that of the ring 13 as the parts move above the neutral position of the ring 17.

Fig. 4 is similar to the structure of Figs. 1, 2 and 3 except that the primary winding 12 occupies a position at the upper portion of the middle leg of the core and the rings 13 and 17 are reversed in their relative positions. Also the conducting bar 10 instead of being above the contacts 7a of the spring strips 7 is positioned below these contacts; and the movable unit is biased by a compression spring 20 to move the parts to the uppermost position when no current passes in the primary winding 12. Also, instead of providing a bar 9 of insulation above the spring strips as in Fig. 1, a bar 21 of insulation is positioned below the spring strips at an intermediate portion thereof. The short-circuiting bar 10 instead of being supported at its ends, is supported by a central downwardly extending rod 22 mechanically connected with a bail 23 connected at its lower ends to opposite sides of the ring 17. The spring 20 is shown engaging the core 11 at its lower end and a disk 24 at its upper end, the disk being secured to the upper portion of the bail 23.

The operation of the structure of Fig. 4 is similar to that already described with reference to Figs. 1 to 3, except the movement of the parts is reversed. When alternating current is passed through the control winding 12, the downward force exerted upon the ring 13 predominates over the upward force of the spring 20 and the upward force exerted upon the ring 17. The downward movement of the parts then causes certain of the resistive elements 6 to be inserted in the field circuit of the exciter. Thus the initial downward movement will first cause the left-hand strip 7 to engage the insulating bar or strip 21, breaking circuit with the bar 10 and causing the left-hand resistive section 6 to be inserted in the field circuit. Further downward movement will cause additional sections of the resistance to be included in the field circuit successively. The regulating action is similar to that already described with reference to Figs. 1 to 3.

Fig. 5 is similar to Fig. 1 in connections of the parts but a different form of resistive controller is shown and the actuating transformer means is similar to that of Fig. 4. The resistive controlling device is indicated of the form shown in the patent of A. M. Cohen No. 2,340,579 granted February 1, 1944. It comprises a series of conducting disks 25, shown in Fig. 6, insulated from each other and mounted upon a central longitudinal support. The disks are formed to provide a series of contact surfaces 26 which are of a wide open V formation and are engaged at opposite sides of the V by a longitudinally extending contact bar or conducting roller 27. This is carried at its opposite ends by a bail 28. Each disk 25 is provided with a rearward extension 25a for convenient connection thereto of the lead wires connected to the resistive elements 6, as shown in Fig. 5. A few only of such elements and connections are shown for clearness. These elements are connected in series with each other and in series with the field winding 4 of the exciter as shown in Fig. 1. When the roller 27 is in its lowest position, as shown in Figs. 5 and 6, it bridges the end contact disks and thereby short-circuits all of the resistive elements 6, giving the exciter its highest field strength; and as the roller moves upwardly, it inserts more and more of the resistive sections 6 in the field circuit. At the uppermost position of the roller, the exciter is given its weakest field strength. The range of movement of the roller between limiting positions is comparatively small for securing the control from full field strength to a weak field; and as there are a multiplicity of contact disks and of the elements 6, the change between steps is slight, giving close and accurate refinement of control with slight movement of the roller.

The arms of the bail 28 are formed with and extend downwardly from a strip of sheet metal 29 which extends upwardly at one end and downwardly at its lower inner end. A spring 30 is secured at its inner end to a lever 31 near the pivot 32 of the lever and is secured at its other end to the downward extension of the strip 29. The upper front end of the strip 29 is fixed to the lower end of a flexible sheet metal strip 33, the upper end of which is fixed to the outer end portion of the lever 31. The strip 33 is of suitable material, such as Phosphor bronze and in effect forms a hinge for the roller supporting strip. The spring 30 serves to impose a proper pressure of the roller 27 against the inclined rows of contact surfaces 26 for insuring good electrical contact in each adjusted position of the roller. A bail 34 embraces opposite sides of the ring 13 and is connected at its lower portion by a pin and slot connection with the inner end of the lever 31. A compression spring 35 forces the rings 13 and 17 of the transformer to their uppermost position when the apparatus is not in operation and causes the roller 27 to occupy its lowest position which then short-circuits the exciter field resistance for imposing full field strength on the exciter. The movable portion of the apparatus, including the lever 31, the rings 13 and 17, the strip 29 and roller 27, is mechanically balanced on opposite sides of the pivot 32. This prevents shocks and jars from interfering with the proper regulation and control of the parts in any position the apparatus may assume.

In operation the disclosures of Figs. 5 and 6 operate in a manner similar to that already described. Any increase in voltage above normal causes the ring 13 to be moved downwardly somewhat and the roller 27 moved upwardly to insert a compensating amount of the resistive elements 6 in the field circuit of the exciter and thereby weaken the field of the main generator for reducing the voltage to its approximate normal value. Upon any decrease in voltage of the load circuit, the reverse action takes place. The ring 17 in Fig. 5 acts in a similar manner to that already described with reference to Fig. 4.

Fig. 7 is similar to Fig. 5 except the direction of movement of the controlling apparatus is reversed. The transformer responsive device is similar to that shown in Fig. 2 and is biased to its lowest position when the apparatus is not operating. This is accomplished by a spring 34 connected at one end to the upper end of the lever 31 and at the other end to a fixed point. In this case the fixed resistive device is reversed in position from that shown in Fig. 6 so that when the roller 27 is in its uppermost position, all of the resistive elements 6 are short-circuited. The operation as a regulator is similar to that already described with reference to Figs. 1 to 3.

The conducting elements or rings 13 and 17 are essentially secondaries of a transformer and are movable for the purpose of control as distinguished from being fixed in position as in the usual transformer. The additional secondary conducting element 17 may or may not be used but is desirable in some cases for affecting the sensitiveness of response.

Although certain embodiments of the invention have been shown and described, it will be understood that various modifications and various adaptations to other uses may be made for particular requirements without departing from the scope of the invention.

I claim:

1. Electric controlling apparatus comprising a fixed core, a primary winding thereon for receiving a variable controlling current, a secondary closed circuited conducting element encircling said core and variably movable in a straight line direction on said core with reference to said primary winding by the reactive force of the current induced in said element by the change of flux due to said primary winding, said element having a low temperature coefficient of resistance for overcoming the effect of temperature changes, and controlling means variably adjusted by the movement of said element in response to change of said controlling current.

2. Electric controlling apparatus comprising a fixed core, a primary winding thereon for receiving a variable controlling current, a secondary closed circuited conducting element encircling said core and variably movable on the core with reference to said primary winding by the reactive force of the current induced in said element by the change of flux due to said primary winding, an additional secondary closed circuited conducting element encircling said core and variably movable on the core with reference to said primary winding by the reactive force of the current induced in said additional element by the change of flux due to said primary winding, said additional conducting element being mechanically connected with said first named element and movable therewith, the relative location of said secondary elements with reference to said primary winding being such that the forces acting thereon tend to move said elements in opposite directions in at least certain positions of said elements, and means variably adjusted by the movement of said elements in response to change of said controlling current.

3. Electric controlling apparatus comprising a fixed core, a primary winding thereon for receiving a variable controlling current, a secondary closed circuited conducting element encircling said core and variably movable on the core with reference to said primary winding by the reactive force of the current induced in said element by the change of flux due to said primary winding, an additional secondary closed circuited conducting element encircling said core and variably movable on the core with reference to said primary winding by the reactive force of the current induced in said additional element by the change of flux due to said primary winding, said additional conducting element being mechanically connected with said first named element and movable therewith, said secondary conducting elements being positioned on opposite sides of the magnetic center of said primary winding in at least certain positions thereof, and means variably adjusted by the movement of said elements in response to change of said controlling current.

4. Electric controlling apparatus comprising a fixed core, a primary winding thereon for receiving a variable controlling current, a secondary closed circuited conducting element encircling said core and variably movable on the core with reference to said primary winding by the reactive force of the current induced in said element by the change of flux due to said primary winding, an additional secondary closed circuited conducting element encircling said core and variably movable on the core with reference to said primary winding by the reactive force of the current induced in said additional element by the change of flux due to said primary winding, said additional conducting element being mechanically connected with said first named element and movable therewith, the relative location of said secondary elements with reference to said primary winding being such that the forces acting thereon tend to move said elements in opposite directions in at least certain positions of said elements, and means variably adjusted by the movement of said elements in response to change of said controlling current, said means being biased to move in one direction and said first named element exerting a force in opposition to the direction of said bias and said second named element exerting a force acting with said bias upon the passage of current through said primary winding in at least certain positions of said elements.

5. Electric controlling apparatus comprising a fixed core, a primary winding thereon for receiving a variable controlling current, two secondary closed conducting rings encircling said core and variably movable on the core with reference to said primary winding by the reactive force of the current induced in said elements by the change of flux due to said primary winding, said rings being mechanically connected together and spaced from each other and positioned on opposite sides of the magnetic center of said primary winding in at least certain positions thereof, and means variably adjusted by the movement of said rings in response to change of said controlling current.

FRANK G. LOGAN.

REFERENCES CITED

The following references are of record in the file of this patent:

UNITED STATES PATENTS

| Number | Name | Date |
|---|---|---|
| 502,788 | Thomson | Aug. 8, 1893 |
| 1,711,285 | Peterson | Apr. 30, 1929 |
| 2,069,610 | Juillard | Feb. 2, 1937 |
| 1,900,707 | Godsey | Mar. 7, 1933 |
| 2,246,306 | Kovalsky | June 17, 1941 |
| 2,295,393 | Exner | Sept. 8, 1942 |
| 1,179,530 | Kennedy | Apr. 18, 1916 |